United States Patent [19]

Badelt

[11] Patent Number: 5,078,193

[45] Date of Patent: Jan. 7, 1992

[54] WHEELBARROW AND TRAILER WHEEL APPARATUS

[75] Inventor: Jeffrey A. Badelt, Scottsdale, Ariz.

[73] Assignee: Discount Tire Co., Inc., Scottsdale, Ariz.

[21] Appl. No.: 611,663

[22] Filed: Nov. 13, 1990

[51] Int. Cl.$^5$ ............................................. B60C 25/06
[52] U.S. Cl. ..................................................... 157/21
[58] Field of Search ............................. 157/14, 17, 21

[56] References Cited

U.S. PATENT DOCUMENTS

| | | |
|---|---|---|
| 2,334,606 | 11/1943 | Castiglia . |
| 3,267,977 | 8/1966 | Turpin . |
| 3,474,840 | 10/1969 | Scott . |
| 3,580,320 | 5/1971 | Roberts ................................. 157/21 |
| 3,583,238 | 2/1971 | Haynes ............................ 157/21 X |
| 3,667,299 | 6/1972 | Roberts ............................ 157/21 X |
| 3,888,128 | 6/1975 | Mitchell ................................ 73/484 |
| 4,133,363 | 1/1979 | Gardner ............................... 157/1.3 |
| 4,433,578 | 2/1984 | Hill ......................................... 73/487 |
| 4,478,081 | 10/1984 | Greene ................................... 73/487 |

Primary Examiner—James G. Smith
Attorney, Agent, or Firm—Charles E. Cates

[57] ABSTRACT

A small diameter tire changer has means for anchoring a base, a standard on the base, and a platform on the standard. A spindle rises from the platform. Over the spindle an adaptor plate is reversible with means for engaging the lug holes of either a four hole or five hole rim and the platform. Optional spacer means and means for engaging the web of a rim are provided. Means for retaining the wheel on the adaptor are provided.

15 Claims, 2 Drawing Sheets

WHEELBARROW AND TRAILER WHEEL APPARATUS

FIELD OF THE INVENTION

This application relates to tire changing in motor vehicle tire stores and garages in the field of small diameter tires such as trailer and wheelbarrow tires.

BACKGROUND OF THE INVENTION

Tire changing devices are generally designed for large diameter tires, i.e., passenger car or larger, and several brands of automatic devices for large diameter tires are found in tire stores.

Small diameter tires are not a great percentage of a tire store's business, but they must be handled as part of the overall business of dealing in tires. Trailer and wheelbarrow tires, for example, are customarily changed on the floor, holding the tire down by the operator's knees. This is an awkward procedure and one step in the procedure is particularly dangerous: Reinflating the tire. Tires having tight beads are especially susceptible because, on changing the tire on the rim, the operator may make a nick in the tire bead or lip of the wheel. The result is a weakness that may cause the tire to explode on reinflation. If the rim is not securely fastened down the explosion may cause serious injury to the human operator. Accordingly, there is a need for an inexpensive, simply constructed and simple to operate tire changing apparatus that is safe and easy to use in the hands of the operators. But nothing to the inventor's knowledge is available for use in changing small diameter tires.

BRIEF SUMMARY OF THE INVENTION

The present invention meets the needs of the business by providing a lightweight tire changing apparatus that can be retrofitted to an automatic tire changer for temporary use or bolted to a work bench as a permanent installation. In combination with the automatic changer or work bench, this easy to use improvement provides a base for secure attachment to the rim clamps on the changer of an automatic tire changer or to a work bench. A standard rises from the base, terminating in a platform for receiving an adaptor, as hereafter explained. The platform has a plurality of apertures spaced to receive either two studs or three studs attached to an adaptor plate, which latter is a generally flat surfaced disk, either side of which fits the platform surface. One side or surface of the adaptor plate has a set of two projecting studs sized and spaced to fit two of the lug holes of a four bolt hole wheel and the other side or surface of the adaptor plate has a set of three projecting studs sized and spaced to fit three of the five holes in a five bolt hole wheel. Either set of studs will fit into the apertures in the platform, leaving the other side facing up to receive a wheel with an appropriate lug bolt hole configuration.

A spindle rises from the center of the platform and passes through the center of the rim as received by the adaptor. Retaining means, preferably threads on the spindle and a mating, threaded retaining nut are used to secure the rim to the adaptor plate. Wheel and adaptor plate are securely fixed in place by means of the studs, the platform standard and the base which is in turn securely fixed temporarily or permanently to another means. At that point a tire changing procedure can be used, either for a wheel fixed on a bench, or a wheel on a rotatable tire changer, in the manner practiced on large diameter wheels.

In many instances an auxiliary attachment will be necessary. A spacer that has a flared end to engage the inner edges of the tire rim and a riser from the flared end must be employed to clear a deep profile wheel. After the spacer is in place, the retaining nut is screwed on as before. Above the nut, a loose fitting sleeve may be placed around the exposed portion of a threaded spindle to protect the threads.

BRIEF DESCRIPTION OF THE DRAWINGS

Turning now to the drawings in which a presently preferred embodiment is illustrated.

DETAILED DESCRIPTION OF THE PREFERRED EMBODIMENTS

Figure 1:
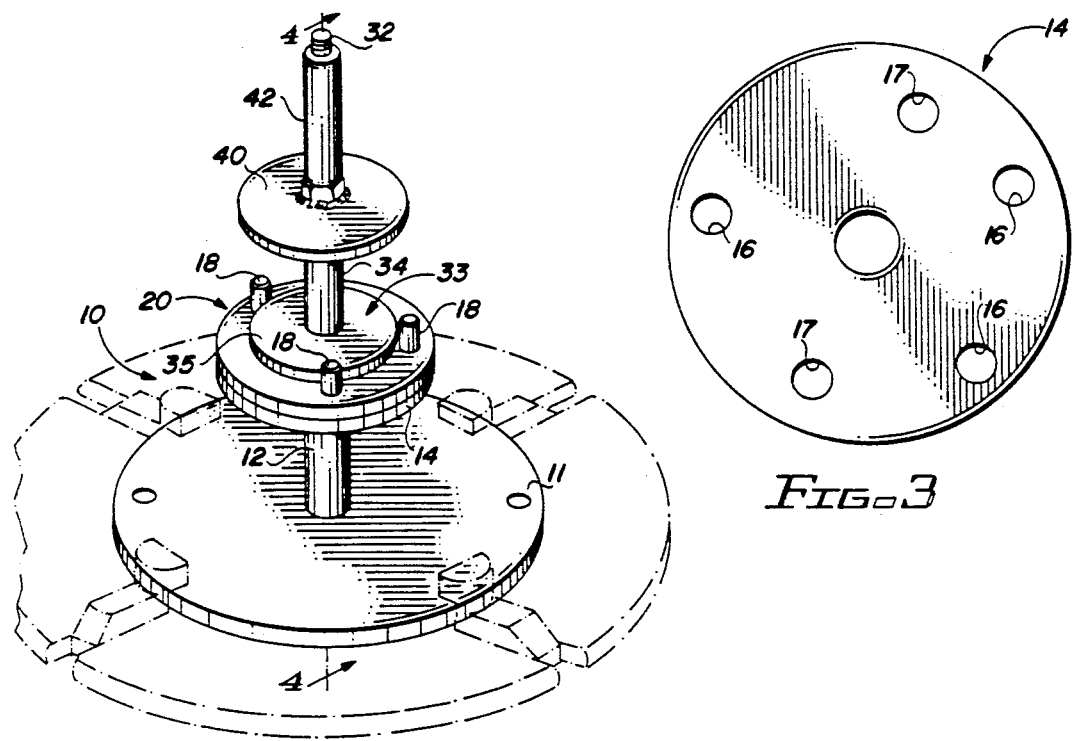
FIG. 1 is a perspective view of the apparatus mounted in a preferred environment on an automatic tire changer partially shown in phantom outlined.
Figure 3:
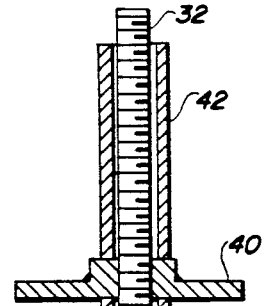
FIG. 3 is a plan view of the platform taken along the lines of 3—3 in FIG. 2.
Figure 5:
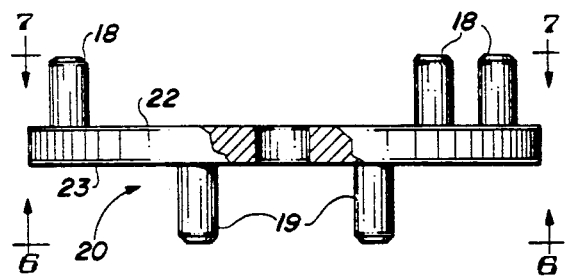
FIG. 5 is an elevation view of the platform of FIG. 3, partially broken away.
Figure 4:
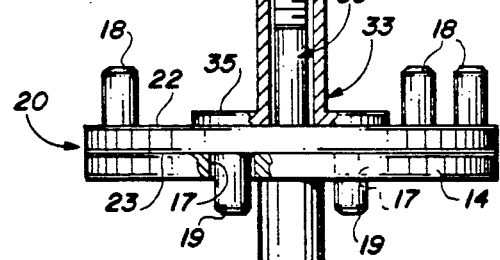
FIG. 4 is a section taken along the lines of 4—4 of FIG. 1.
Figure 4:
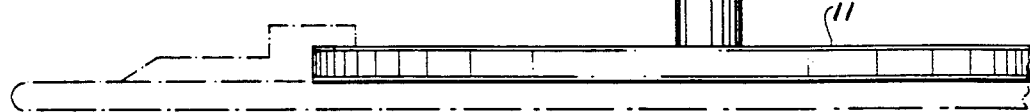
Figure 6:
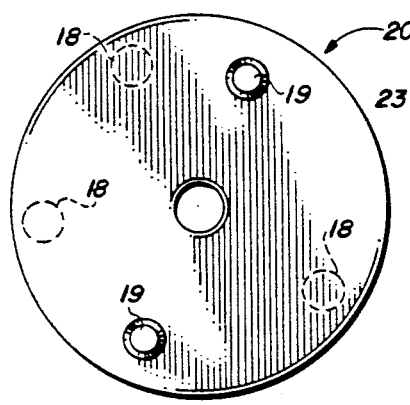
FIG. 6 is a plan view of the platform of FIG. 5 taken along the lines 6—6.
Figure 7:
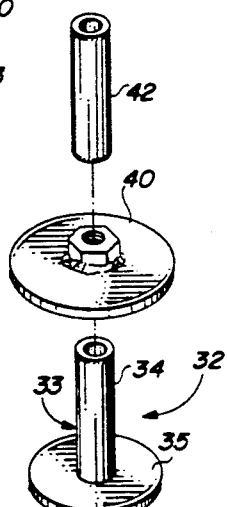
FIG. 7 is a plan view of the platform of FIG. 5 taken along the lines 7—7.
Figure 7:
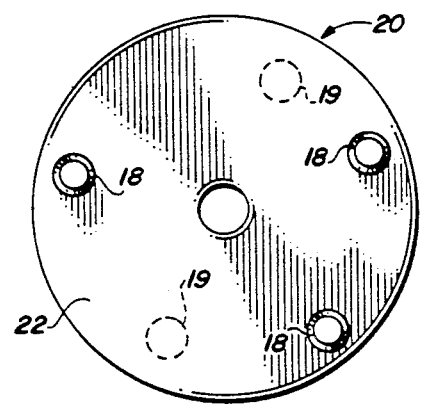
Figure 9:
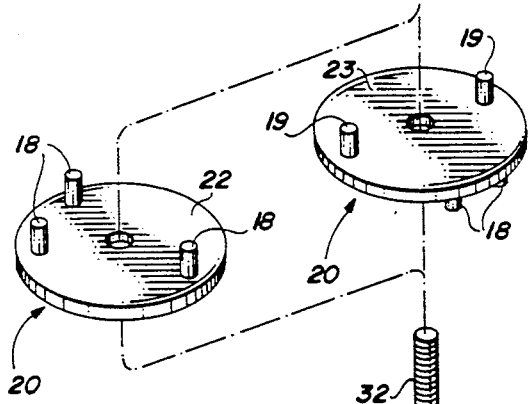
FIG. 9 is a view of the apparatus, partially in section, showing a rim in place.
Figure 9:
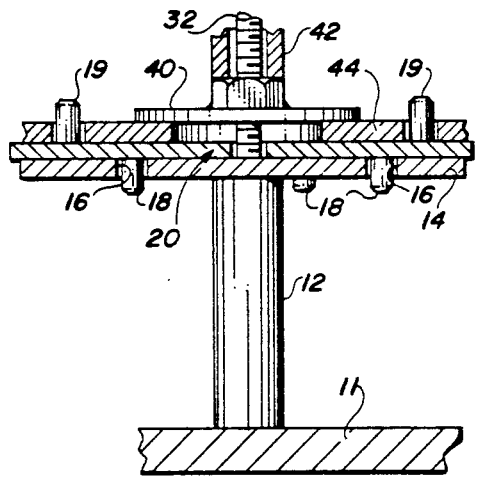
Figure 2:
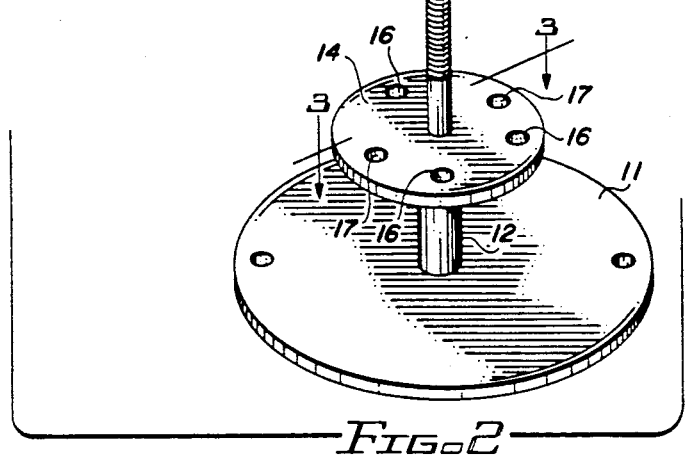
FIG. 2 is an exploded view of the apparatus of FIG. 1.
Figure 8:
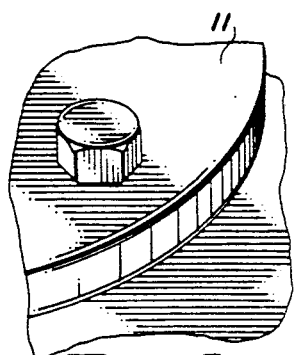
FIG. 8 is a partial view of an alternative embodiment showing the base of the apparatus in another environment, bolted to a work bench.

In its environment the apparatus of this invention is either bolted to the surface of a work table or bench or is utilized in a Eurochanger power machine used for large diameter tires. The base 11 of the apparatus 10 is engaged by the dogs of the Eurochanger, shown in FIG. 1 in phantom outline, to secure the base 11 of the apparatus to the platform (also shown in phantom outline) of the Eurochanger. Rising from the base 11 is a fixed standard 12 which terminates in a fixed platform 14 which, as shown in FIG. 2, is provided with a plurality of apertures 16, 17 the number of apertures in this case being five, which are spaced so that the studs 18 or 19 of adaptor 20 may be received in either a set of two of the holes or a set of three of the holes in the apertures in the platform 14. The adaptor 20 has two opposing surfaces 22 and 23. The apertures 16 and 17 are grouped respectively in sets of three and two and spaced to receive respectively the three studs 18 or the two studs 19 of the adaptor 20, which is shown in FIG. 2, alternatively with the surface 22 up or the surface 23 up, depending on whether the small diameter wheel to be mounted on the apparatus is a wheel having five holes or four holes. This relationship with the wheel can be seen with respect to a four hole wheel in FIG. 9 where a portion of the web of the wheel 44 is shown in cross section.

Attached to the platform 14 and rising from the center thereof is a spindle 30 that has a smooth shank part of the way up and thread means 32 the remainder of the length of the spindle to its top. A unit 33 which serves as a spacer 34 and compression plate 35 fits loosely as a sleeve around the spindle 30. With the unit 33 in place the retainer nut 40, which has threads mating with the threads of the spindle, is screwed down on the unit 33 to securely hold the rim 44 on the spindle. Optionally a sleeve 42 which loosely fits around the threads may be placed above the retainer nut 40 to protect the threads of the spindle.

I claim:

1. A tire holding apparatus comprising:
    (a) an adaptor plate having opposing first and second surfaces, a first set of studs, projecting from said first surface, adapted to engage a tire rim having four lug holes in its web, and a second set of studs projecting from said opposing second surface, adapted to engage the holes of a five hole rim;
    (b) a base;
    (c) a standard rising from said base;
    (d) a platform on said standard having an upper surface and means defining a plurality of apertures through said platform to receive the set of studs projecting from said first and second surfaces of said adaptor plate not used to engage a tire rim;
    (e) a spindle rising concentrically from said platform;
    (f) retaining means engaging said spindle to hold the tire rim in place.

2. The apparatus of claim 1 wherein the retaining means are screw threads on the spindle and a threaded nut adapted to fit said spindle threads.

3. The apparatus of claim 2 further comprising a sleeve to protect the exposed threads of the spindle.

4. The apparatus of claim 1 comprising a bench and means for attaching said base to said bench.

5. The apparatus of claim 2 comprising a bench and means for attaching said base to said bench.

6. The apparatus of claim 3 comprising a bench and means for attaching said base to said bench.

7. The apparatus of claim 1 comprising an automatic tire changing apparatus wherein said base is dimensioned to fit the grip of the changer.

8. The apparatus of claim 2 comprising an automatic tire changing apparatus wherein said base is dimensioned to fit the grip of the changer.

9. The apparatus of claim 3 comprising an automatic tire changing apparatus wherein said base is dimensioned to fit the grip of the changer.

10. The apparatus of claim 1 further comprising a disk sized to engage the inner edges of the rim and a sleeve, disposed around said spindle between said disk and said retainer nut.

11. The apparatus of claim 2 further comprising a disk sized to engage the inner edges of the rim and a sleeve, disposed around said spindle between said disk and said retainer nut.

12. The apparatus of claim 3 further comprising a disk sized to engage the inner edges of the rim and a sleeve, disposed around said spindle between said disk and said retainer nut.

13. The apparatus of claim 1 further comprising a sleeve over the threaded spindle above the retainer nut.

14. The apparatus of claim 2 further comprising a sleeve over the threaded spindle above the retainer nut.

15. The apparatus of claim 3 further comprising a sleeve over the threaded spindle above the retainer nut.

* * * * *